Patented May 7, 1935

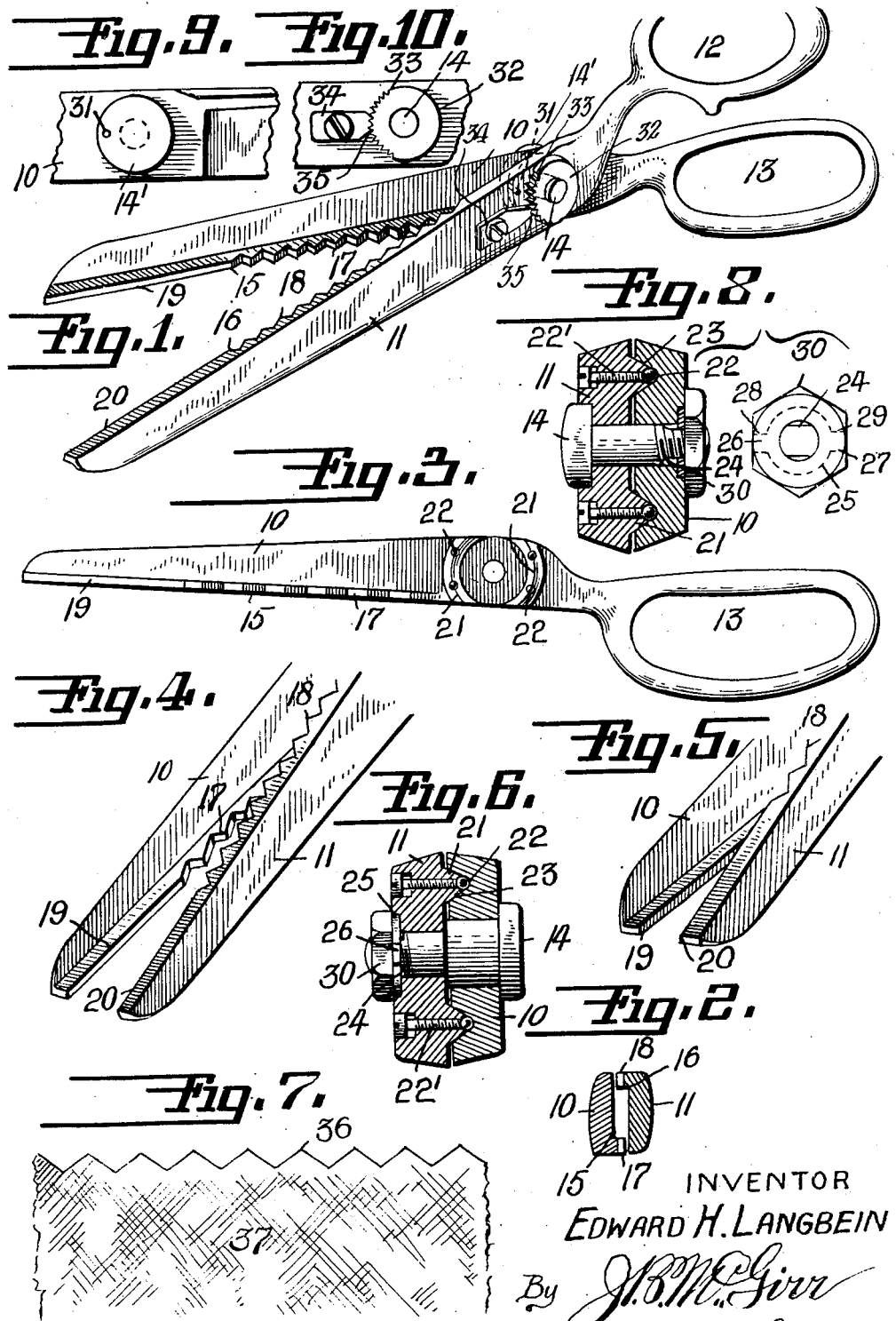

2,000,852

UNITED STATES PATENT OFFICE 2,000,852

SHEARS

Edward H. Langbein, Brooklyn, N. Y., assignor to Samuel Briskman, Manhattan, N. Y.

Application September 26, 1932, Serial No. 634,804

3 Claims. (Cl. 164—81)

My invention relates to improvements in shears or scissors for tailoring, dressmaking, and other uses wherein the raw edges of the cloth material may be serrated with shears instead of doing as is now done by hand.

The object of the invention is to provide a light, simple, cheap, neat and easily operated shears or scissors that is durable, with every means to prevent derangement, yet made so as to take up any wear. Such shears are desired by dressmaker and tailor, so that they may quickly and easily serrate the raw edge in less time than is now consumed and at the same time making all the serrations of equal size.

The main object of the invention is to provide such shears or scissors with inwardly projecting L-shaped blades, having their forward end provided with a plain cutting edge. If the operator wishes to serrate the edge of the material, he will use the rear part of the shears, likewise if he should desire to cut buttonholes or otherwise nick the edge of the cloth for further operation he will use the forward end of the shears. Just back of such plain cutting part of the shear are teeth cut so as to cooperate with the teeth on the second member. In some instances it may be preferable to provide a shears or scissors with the teeth extending for the whole distance of the blade.

Another object of the invention is to provide a ball bearing hinge that will permit the blades to operate with as little friction as possible. The balls being housed in a race in one blade, while the adjusting means are located in the other blade, permits the same to work very freely, and at the same time assists the pivot stud in keeping the blades in perfect alignment.

Other objects and advantages of my invention will be apparent as it is better understood by reference to the following specification when read in connection with the accompanying drawing, in which:

Fig. 1 is a perspective of a pair of shears constructed as at present preferred; Fig. 2 is an enlarged cross section showing the position of the respective cutting edges when closed; Fig. 3 is a side view of one blade of the shears or scissors showing the position of the teeth with respect to the plain cutting portion, also the balls arranged in a V-shaped groove; Fig. 4 is a partial perspective view showing the cooperating teeth intermeshing; Fig. 5 is a like view showing the free ends of the shears with a plain cutting edge thereon for quick work; Fig. 6 is an enlarged view showing the hinge of the shears or scissors, and the position of the ball bearing with respect to the race in the second member; Fig. 7 illustrates the kind of edge cut by my shears or scissors; Fig. 8 is a modification of Fig. 6; Fig. 9 a face view of another modification of the pivot, and Fig. 10 is the reverse side of the same.

Shears or scissors have been made with many varieties of edges, all of which were designed for their particular purpose. But it remained for applicant to provide shears or scissors that would fulfill a practical and a long-unsatisfied want, viz., of the operator who desires to serrate the raw edge of cloth materials. None of said shears or scissors could produce a serrated edge along a piece of cloth or other material by one straight closing of the shears, and without turning the hand and shear to produce the cut desired. This invention operates in the very same manner as any other shears, but the results have never been accomplished before, nor can the result be accomplished by any shears or scissors known to applicant.

It will be noted with reference to the drawing that there are no separate parts to be fitted to the shears or scissors to accomplish the desired results, consequently, nothing to get out of order once the shears have been adjusted. The means generally employed for securing the two blades together, for instance, a stud or rivet, causes wear on one of the blades necessitating repeated realignment to obtain satisfactory results.

Referring now to Fig. 1, will be seen my new and improved shears or scissors having blades 10 and 11, each blade having its usual finger opening 12 and 13 for operating the same. The blades move about a stud 14. Each blade has at one edge a lip 15 and 16 extending the length thereof at right angles to the blade proper, and these lips may be provided with teeth 17 and 18 from one end to the extreme point, or as shown, for a short distance may be provided with a plain cutting edge 19 and 20 for pushing the shears or scissors through the material without operating the blades, as is so often done by these skilled operators.

Referring now to Figs. 3 and 6, it will be noted that one cutting member is provided with a slightly raised level or inverted V portion 21, and in the upper part, or at the apex is suitably housed one or more balls 22, which fit into suitable grooves 23 in the other cutting member. This raised portion and the groove engaged thereby are arranged concentrically with relation to the stud 14. By so arranging the ball bearings the shears are permitted to operate more freely and without any material friction. The ball bearing may be adjusted by screws 22' to provide workable relationship between the blades of the shears.

In shears and scissors it is, as has been noted, very important to provide a stud that will be locked to one member. As shown in Figs. 6 and 8, it will be seen that the stud 14 in each case has a flat part 24 on each side, while the washer 25 (shown in dotted lines) fits such flat parts and is provided with two fingers 26 and 27 which fit corresponding recesses 28 and 29 in the blade, so that it will be seen that the washer 25 and nut 30 will hold the stud against independent movement. Figs. 9 and 10 illustrate another modification of a pivot construction for the two members of the shears. In this form, the head of stud 14' is secured to one blade member by a pin 31, the stud extending through the two blades. Nut 32, the periphery of which is in part provided with teeth 33, is mounted on the threaded end of the stud. A nut lock 34 is secured to the blade, the teeth 35 of said lock fitting into teeth 33 to retain the nut in adjusted position. In operation, as the blades are opened nut 32 turns on the threaded end of the stud, which constitutes a pivot upon which the blades may turn readily. Upon closing of the blades, the latter similarly ride on the threaded portion of the stud. During opening, the threads tend to separate the blades; however, during the closing and cutting movement, the action of the threads is to force the blades into close contact with each other, thus assuring proper cutting operation.

Instead of having teeth as shown, the edge may be provided with any desired shaped projections or curves as may be desired. In all tailoring establishments it is and has always been customary to serrate, as at 36, along the raw edge of the material 37 as shown in Fig. 7 by hand; with my shears it will be very simple, and more readily accomplished, saving time and labor.

By the novel arrangement of shears as shown, it is possible for the operator to operate the shears as readily as is done with ordinary shears, with the added result that while cutting the raw edge the same may be serrated, thus giving to the garment the tailored effect that is always desirable.

The arrangement of the blades as shown with their cutting edges on the L-shaped extensions of the blades and with the ball bearings located about the pivotal stud, will reduce materially the friction while operating. With the stud locked to one member, the other member has the utmost freedom to move readily about said pivot. The shears or scissors thus built will not require adjustments and repairs and replacements as often as is now the case.

In accordance with the provisions of the patent statutes, I have herein described the principle and operation of my invention, together with the means which I now consider to represent the best embodiment thereof, but I desire to have it understood that the means shown are only illustrative and that the invention may be carried out by other means. Also, while it is designed to use the various features and elements in the combination and relations described, some of these may be altered and others omitted without interfering with the more general results outlined, and the invention extends to such use.

Having thus described the end sought by me, what I claim as new and desire to protect by Letters Patent is:—

1. A cutting implement of the character described comprising a pair of pivotally connected blades, lips on said blades projecting at an angle therefrom, said lips being provided with cutting edges comprising serrated portions adjacent the pivotal connection and plain portions remote from the pivotal connection.

2. Scissors or the like comprising a pair of juxtaposed pivoted blades, lips extending toward each other from said blades, deformed cutting edges on said lips, means for pivoting said blades and for assuring close contact between said cutting edges during cutting movement of the blades, said means including a stud securely fixed to one blade against movement relative thereto, the other blade being freely movable on said stud, and adjustable means for assuring, by its action during the cutting movement, close contiguity between the cutting edges of said blades during cutting movement.

3. Scissors or the like comprising a pair of juxtaposed pivoted blades, lips extending toward each other from said blades, deformed cutting edges on said lips, and means for pivoting said blades and for assuring close contact between said cutting edges during cutting movement of the blades; said means including a stud securely fixed to one blade against movement relative thereto, the other blade being freely movable on said stud, and adjustable means for assuring close contiguity between the cutting edges of said blades during cutting movement; said adjustable means comprising a nut threaded upon said stud, and adjustable means for securing said nut to said movable blade, whereby said nut is adapted to ride upon said threads to force said blades toward each other during closing movement thereof.

EDWARD H. LANGBEIN.